(12) United States Patent
Lasserre

(10) Patent No.: US 7,406,518 B2
(45) Date of Patent: Jul. 29, 2008

(54) METHOD AND SYSTEM FOR CONNECTING VIRTUAL CIRCUITS ACROSS AN ETHERNET SWITCH

(75) Inventor: Marc Lasserre, Saratoga, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1465 days.

(21) Appl. No.: 09/861,138

(22) Filed: May 18, 2001

(65) Prior Publication Data

US 2002/0174251 A1 Nov. 21, 2002

(51) Int. Cl.
*G06F 15/173* (2006.01)
(52) U.S. Cl. .................. 709/225; 709/229; 709/238
(58) Field of Classification Search .............. 709/225, 709/238, 229; 370/398, 389
See application file for complete search history.

(56) References Cited

U.S. PATENT DOCUMENTS

| | | | |
|---|---|---|---|
| 5,852,606 A | 12/1998 | Prince et al. | |
| 5,946,313 A | 8/1999 | Allan et al. | |
| 6,259,699 B1 * | 7/2001 | Opalka et al. | 370/398 |
| 6,269,404 B1 * | 7/2001 | Hart et al. | 709/238 |

* cited by examiner

*Primary Examiner*—William C. Vaughn, Jr.
*Assistant Examiner*—Greg Bengzon

(57) ABSTRACT

Transferring data segments and virtual circuit (VC) information related to the data segments across an Ethernet switch from a first connection terminating at an input port of the switch to a second connection originating at an output port of the switch involves utilizing the VC information at the input port to determine the output port of the data segment, generating tunnel frames that include the identified output port and the VC information as overhead and the data segments as payload, transferring the tunnel frames across the switch from the input port to the output port, generating new headers for the data segments using the VC information that was transferred across the switch in the tunnel frames, and transmitting the data segment, including the new header, on the second connection.

41 Claims, 13 Drawing Sheets

| \multicolumn{4}{c}{VC Cross-Connect Look-Up Table} | | | |
|---|---|---|---|
| $I_{PORT}$ | $I_{VC}$ | $O_{PORT}$ | $O_{VC}$ |
| 1,1 | 0/100 | 3,1 | 0/140 | ← VC Switching
| 1,1 | 0/200 | 3,1 | 0/200 | ← VC Stitching

FIG. 9

METHOD AND SYSTEM FOR CONNECTING VIRTUAL CIRCUITS ACROSS AN ETHERNET SWITCH

FIELD OF THE INVENTION

The invention relates to an Ethernet switch with at least two connections, such as asynchronous transfer mode (ATM) or Frame Relay connections, that support virtual circuits (VCs). More particularly, the invention relates to a system and method for transferring data segments from the same virtual circuit (VC) across an Ethernet switch from a first connection that supports VCs to a second connection that supports VCs.

BACKGROUND OF THE INVENTION

The ATM protocol is designed to carry a variety of media types in fixed-length cells with a high level of quality control. Virtual circuits are established across ATM connections to transfer particular flows from one ATM end station to another ATM end station. A VC is defined by a virtual channel (identified by a virtual channel identifier, VCI) and a virtual path (identified by a virtual path identifier, VPI) that exists between the end stations.

FIG. 1 depicts a virtual circuit (identified by a VPI/VCI combination) that is established over an ATM link that includes three ATM nodes. As shown in FIG. 1, the virtual channel extends from a first ATM enabled router 104 (router 1) through an ATM switch 106 and to a second ATM enabled router 108 (router 2).

In some network topologies, two ATM nodes may be connected by an ATM enabled Ethernet switch. For example, FIG. 2 depicts two ATM enabled routers 204 and 208 that are connected by an Ethernet switch 206 that is equipped with ATM interfaces 210 and 212. In the example, a first ATM connection is established between the first ATM enabled router and the Ethernet switch and a second ATM connection is established between the Ethernet switch and the second ATM enabled router. The ATM interfaces of the Ethernet switch act as end stations of the ATM links and therefore two VCs are needed to transfer ATM cells from the same VC between the two routers. Specifically, the first VC (VC 1) is terminated at the input to the Ethernet switch and the second VC (VC 2) is established at the output of the Ethernet switch. It would be ideal to continuously carry a single VC from the first ATM enabled router (router 1) to the second ATM enabled router (router 2), however because of the differences between ATM and Ethernet, the first ATM connection and VC are terminated at the input to the Ethernet switch and the second ATM connection and VC are established at the output port of the Ethernet switch.

One technique for mapping the second VC at the output port of the Ethernet switch involves mapping each incoming VC to a virtual local area network (VLAN) at the input port of the Ethernet switch, switching the ATM traffic from each VC through the Ethernet switch via a VLAN, and then mapping each VLAN to the proper VC at the output port of the Ethernet switch. Although this technique works well, the field for identifying VLANs in an Ethernet network is limited by the IEEE 802.1Q protocol to 12 bits, or 4,096, unique VLANs. When this technique is used to aggregate a large number of subscriber units, such as DSL modems, the small number of unique VLANs becomes the limiting factor in the scalability of the network. In addition to the scalability problem, mapping each VLAN to its proper VC at the output port of the Ethernet switch requires an additional look-up, which is a slow process that could reduce the performance of the ATM interfaces. There are also limitations on the number of learned MAC addresses that can be stored in memory. Similar problems exist when data segments from protocols, such as Frame Relay, are transferred across an Ethernet switch.

In view of the limitations involved with using VLANs to transfer data segments, such as ATM cells or Frame Relay frames, and VC information related to the data segments across an Ethernet switch, what is needed is a method and system for rapidly transferring non-Ethernet data segments and VC information across an Ethernet switch that does not require additional learning or look-ups and that scales beyond 4,096 unique identifiers.

SUMMARY OF THE INVENTION

A method and system for transferring data segments and VC information related to the data segments across an Ethernet switch from a first connection terminating at an input port of the switch to a second connection originating at an output port of the switch involves utilizing the VC information at the input port to determine the output port of the data segment, generating tunnel frames that include the identified output port and the VC information as overhead and the data segments as payload, transferring the tunnel frames across the switch from the input port to the output port, generating new headers for the data segments using the VC information that is transferred across the switch in the tunnel frames, and transmitting the data segment, including the new header, on the second connection. By utilizing the VC information at the input port to determine the output port of the data segments, the tunnel frames can be rapidly switched to the correct output port without the layer 2 learning that is required for other "non-tunneled" frames. Further, by including the VC information for the data segments with the tunnel frame overhead, the new headers can be generated from the VC information without having to do a VC look-up. The method and system can be applied to various protocols that utilize virtual circuit connections, such as the ATM and Frame Relay protocols.

In an embodiment, a method for transferring data segments and VC information related to the data segments across an Ethernet switch from a first connection terminating at an input port of the switch to a second connection originating at an output port of the switch involves steps of receiving, from the first connection, a data segment, including a header, at the input port; identifying, from input port and input VC information that is within the header, if the data segment is to be tunneled across the Ethernet switch; identifying output port and output VC information for the data segment from the input port and input VC information if the data segment is identified as a data segment that is to be tunneled across the Ethernet switch; generating a tunnel frame having a payload and a tunnel frame header if the data segment is to be tunneled across the Ethernet switch, the payload including the data segment and the tunnel frame header including a destination address and a tunnel frame indicator, the destination address including the identified output port and output VC information; transferring the tunnel frame across the Ethernet switch from the input port to the output port that is identified in the destination address of the tunnel frame header; identifying the tunnel frame from the tunnel frame indicator after the tunnel frame has been transferred across the Ethernet switch; removing the tunnel frame header from the identified tunnel frame to obtain the data segment; generating a new header for the data segment using the output port and output VC information that is transferred across the Ethernet switch in the tunnel frame header of the tunnel frame; and transmitting the data segment, including the new header, on the second connection.

In another embodiment, a system for transferring a group of ATM cells from the same input virtual circuit (VC) across an Ethernet switch from a first ATM connection terminating at an input port of the Ethernet switch to a second ATM connection originating at an output port of the Ethernet switch includes input and output segmentation and re-assembly (SAR) units, a VC identification unit, a VC tunnel address unit, a tunnel frame generator, a switch fabric, a frame type identification unit, and a tunnel header removal unit. The input SAR unit receives the group of ATM cells and generates a protocol data unit (PDU) from the group of ATM cells, wherein the PDU is formed from the ATM cells from the input VC such that the PDU is related specifically to the input VC. The VC identification unit is associated with the input port and identifies, from the input VC information, if the PDU is to be tunneled across the Ethernet switch. The VC tunnel address unit is associated with the input port and identifies output port and output VC information for the PDU from the input VC information if the PDU is identified by the VC identification unit as a PDU that is to be tunneled across the Ethernet switch. The tunnel frame generator is associated with the input port and generates a tunnel frame having a payload and a tunnel frame header, the payload including the PDU and the tunnel frame header including a destination address and a tunnel frame indicator, the destination address including the output port and output VC information that is identified by the VC tunnel address unit for the PDU. The switch fabric transfers the tunnel frame from the input port to the output port that is identified in the destination address of the tunnel frame header. The frame type identification unit is associated with the output port and identifies the tunnel frame from the tunnel frame indicator. The tunnel header removal unit is associated with the output port and removes the tunnel frame header from the identified tunnel frame to obtain the PDU. The output SAR unit generates the group of ATM cells from the PDU and from the output port and output VC information that is transferred in the destination address of the tunnel frame header.

In another embodiment, a system for transferring a Frame Relay (FR) frame from the same input virtual circuit (VC) across an Ethernet switch from a first FR connection terminating at an input port of the Ethernet switch to a second FR connection originating at an output port of the Ethernet switch includes an input port central processing unit (CPU), a switch fabric, an output port processing unit, and an output frame generator. The input port CPU includes; VC identification logic for identifying, from input VC information of a received FR frame, if the FR frame is to be tunneled across the Ethernet switch; VC tunnel address logic for identifying output port and output VC information for the received FR frame from the input VC information if the FR frame is identified by the VC identification means as a frame that is to be tunneled across the Ethernet switch; and tunnel frame generator logic for generating a tunnel frame having a payload and a tunnel frame header, the payload including the payload of the received FR frame and the tunnel frame header including a destination address and a tunnel frame indicator, the destination address including the output port and output VC information that is identified by the VC tunnel address unit for the received FR frame. The switch fabric transfers the tunnel frame from the input port to the output port that is identified in the destination address of the tunnel frame header. The output port CPU includes frame type identification logic for identifying the tunnel frame from the tunnel frame indicator and tunnel header removal logic for removing the tunnel frame header from the identified tunnel frame to obtain the payload of the received FR frame. The output frame generator generates an output FR frame from the payload of the received FR frame and from the output port and output VC information that is transferred in the destination address of the tunnel frame header.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 9 depicts an example VC cross-connect look-up table that includes a "VC switching" entry and a "VC stitching" entry.

DETAILED DESCRIPTION OF THE INVENTION

Figure 1:
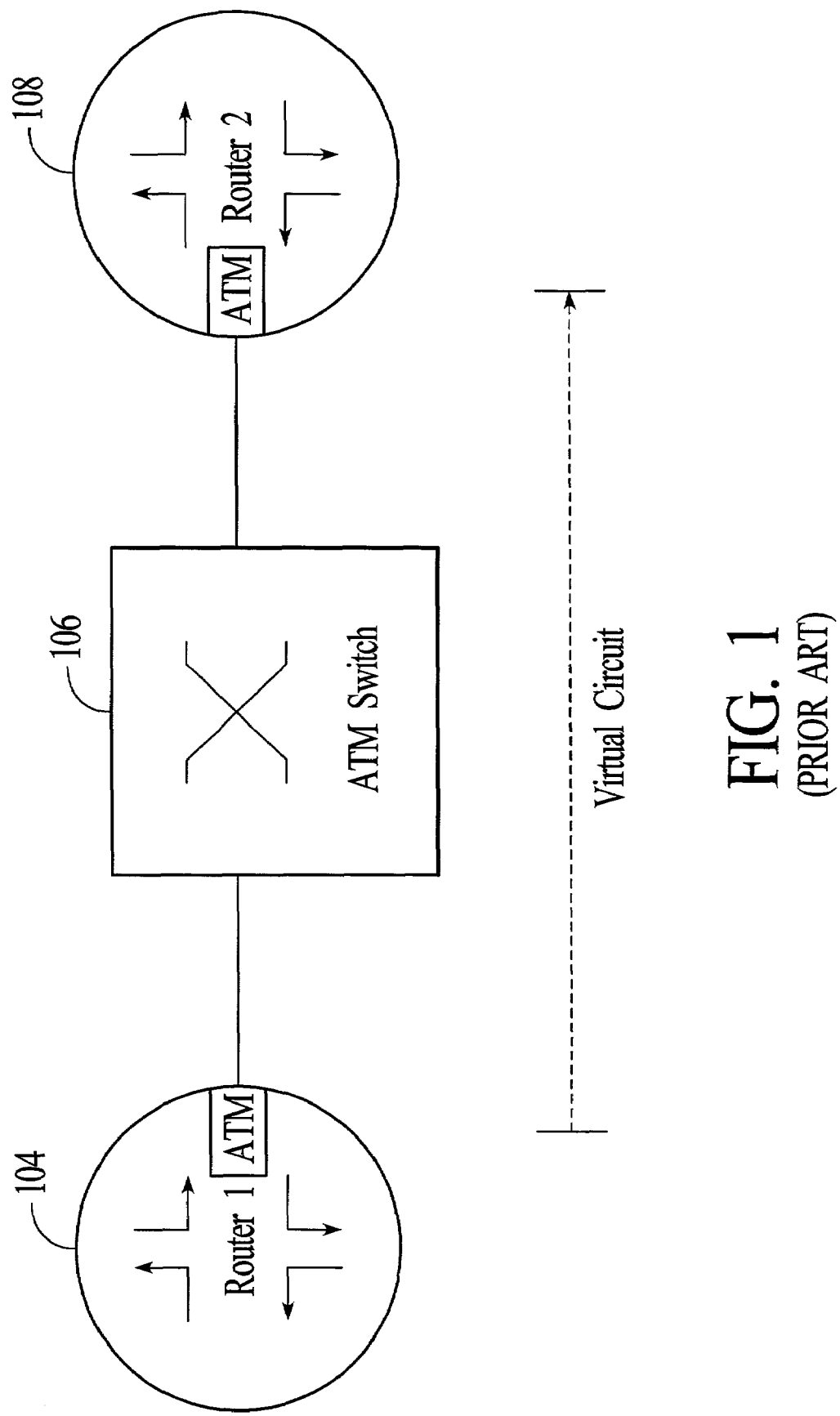
FIG. 1 depicts a virtual circuit that is established between three ATM nodes as is known in the prior art.
Figure 2:
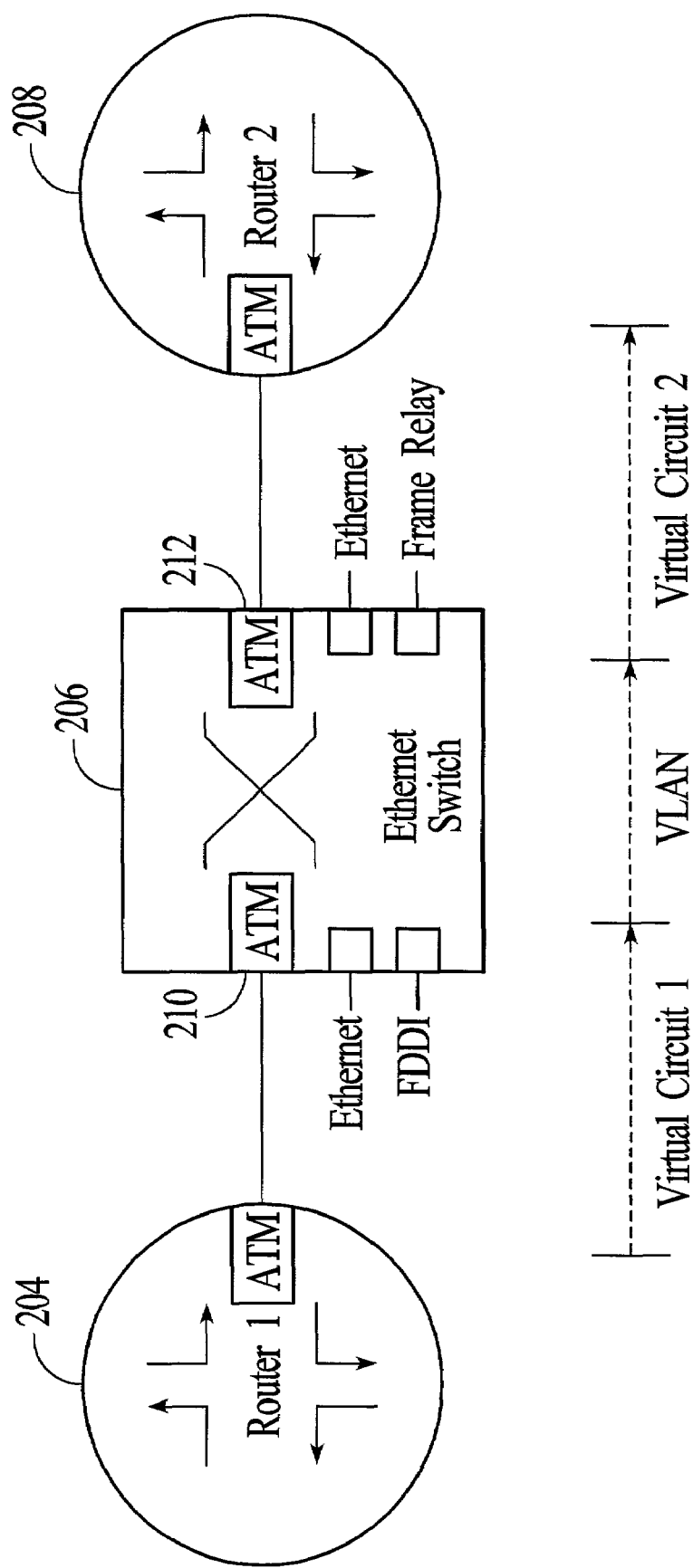
FIG. 2 depicts two ATM connections that are connected by an Ethernet switch through a VLAN as is known in the prior art.
Figure 3:
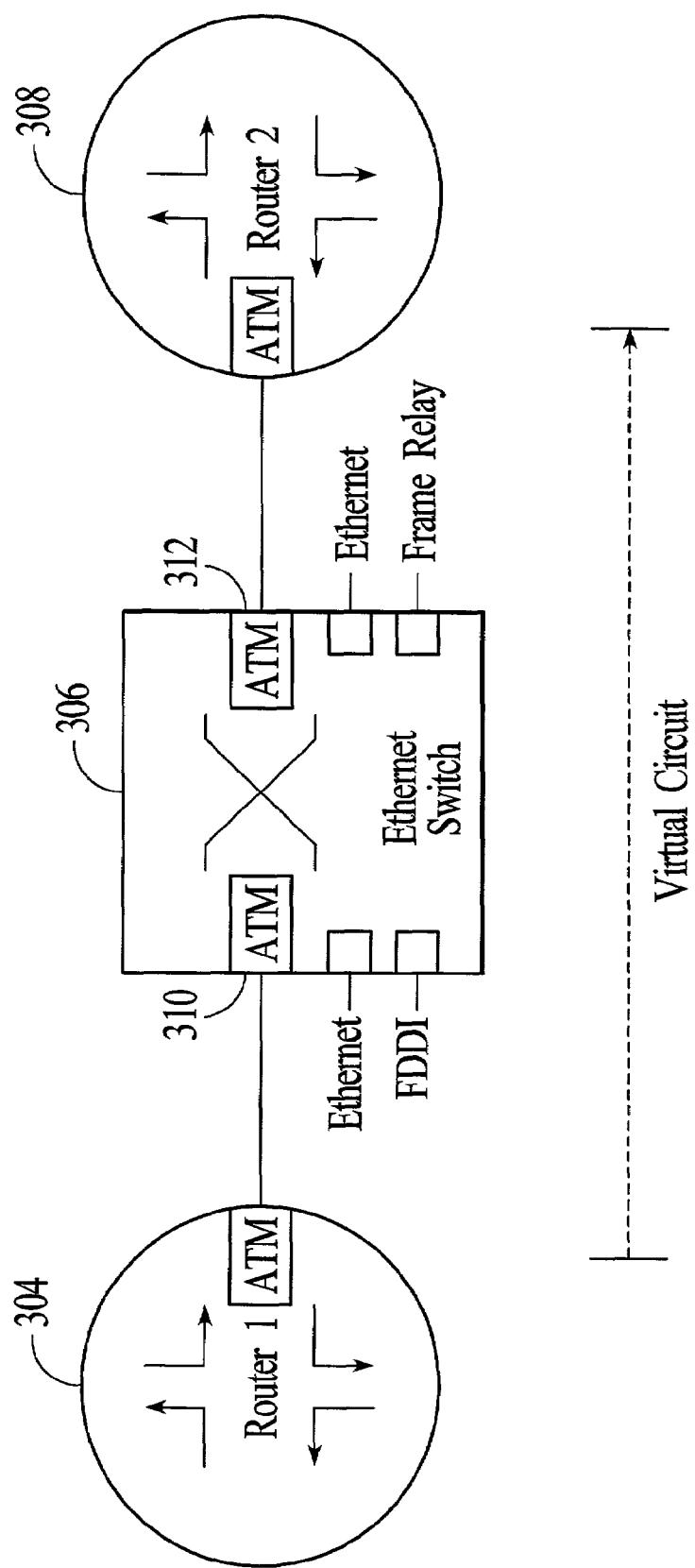
FIG. 3 depicts a system in which a VC from a first ATM connection is logically carried through an Ethernet switch to a second ATM connection in accordance with an embodiment of the invention.

FIG. 3 depicts an embodiment of a system in which a VC from a first ATM connection is logically carried through an Ethernet switch 306 to a second ATM connection. In the embodiment of FIG. 3, the two ATM connections are established between two ATM enabled routers 304 and 308 and two ATM interfaces 310 and 312 that are integrated into the Ethernet switch. In an embodiment, the Ethernet switch includes multiple function-specific switch cards. For example, the ATM interfaces are embodied in switch cards that are inserted into an Ethernet switch housing. Switch cards that support other network protocols, such as Ethernet, frame relay, and FDDI, may also be included within the same Ethernet switch. Although the switch cards may support different network protocols, all of the information in non-Ethernet protocols is converted to Ethernet compliant frames, or "packets," for the switching function within the Ethernet switch. The information that is output from the Ethernet switch is converted to the appropriate protocol by the respective output switch card. In an embodiment, the switch cards may include more than one port and therefore the input port and output port of a data flow can be on the same switch card. For example, although shown on different switch cards in FIG. 3, a single switch card can support ATM connection 1 (between ATM enabled router 1 and the Ethernet switch) and ATM connection 2 (between ATM enabled router 2 and the Ethernet switch). The input port and output port of a data flow can also be on the same port if the input VC is different from the output VC. Throughout this document, the term Ethernet is used to define protocols that include the IEEE 802.3 and Ethernet DIX. Throughout the specification, similar elements may be identified by similar reference numerals.

Figure 4:
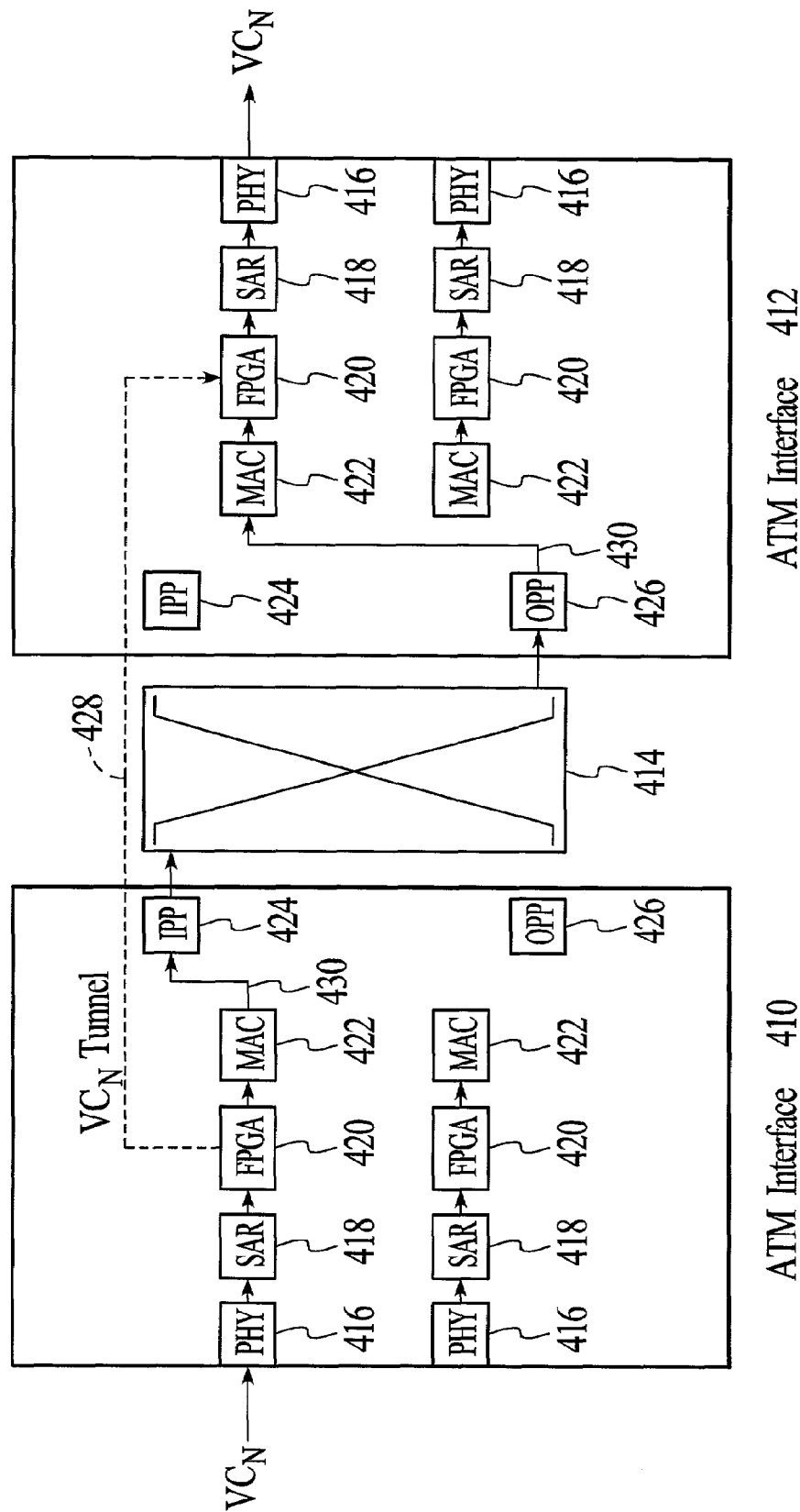
FIG. 4 is an expanded view of two ATM switch cards that are connected by an Ethernet switch fabric and by a VC tunnel in accordance with an embodiment of the invention.

FIG. 4 is an expanded view of the ATM interfaces (switch cards) 310 and 312 of the ATM enabled Ethernet switch 306 shown in FIG. 3. The ATM switch cards 410 and 412 of FIG. 4 are connected by a switch fabric 414 of the Ethernet switch. In the embodiment of FIG. 4, each switch card is a two port switch card, with each port including a physical layer unit (PHY) 416, a segmentation and re-assembly unit (SAR) 418, a field programmable gate array unit (FPGA) 420, and a media access control unit (MAC) 422. Each switch card also includes an input packet processor (IPP) 424 and an output packet processor (OPP) 426. In an embodiment, each functional unit is embodied as a separate integrated circuit (IC) on a circuit board, however, it should be understood that the functional units, or some combination of the functional units, may be integrated onto the same IC.

For example purposes, switch card 410 is considered the input port switch card and switch card 412 is considered the output port switch card although the switch cards function as both input port and output port switch cards. A description of the input port switch card 410 function is followed by a description of the output port switch card 412 function.

At the input port switch card 410, the input port PHY 416 is the physical interface between the incoming signals and the input switch card. In an embodiment that includes an optical connection, the PHY converts incoming light pulses into electrical signals and then identifies the incoming data segments, for example 53-byte ATM cells. The PHY forwards incoming ATM cells to the SAR 418. The input port PHY is a well known functional unit and is not described in further detail.

Figure 6:
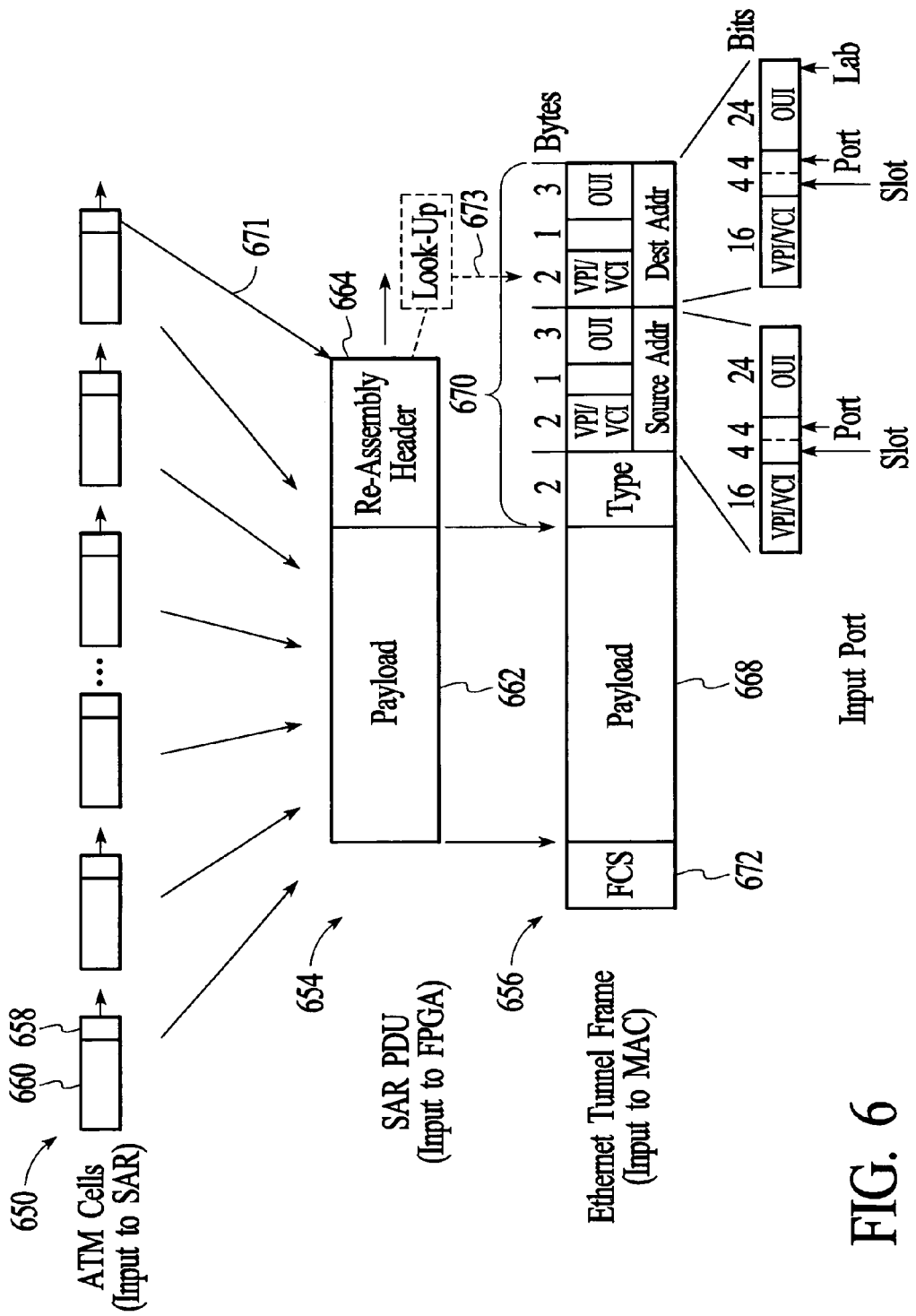
FIG. 6 depicts the transformation of a group of ATM cells to a SAR PDU and then to a tunnel frame in accordance with an embodiment of the invention.

The input port SAR 418 re-assembles incoming ATM cells into a PDU, for example an IP datagram or an Ethernet frame. In an embodiment, the SAR uses the re-assembled PDU to build a SAR PDU. The SAR PDU includes a re-assembly header and a payload. FIG. 6, which is described in more detail below, depicts a group of ATM cells 650 that is re-assembled into a SAR PDU. The re-assembly header includes input port and input VC information from the re-assembled incoming ATM cells and the payload includes the re-assembled PDU (i.e., an IP datagram or an Ethernet frame). In an embodiment, the input port and input VC information is represented by a descriptor that is used to look-up the input port and the input VC. In an embodiment, the SAR re-assembles PDUs according to the AAL-5 protocol as defined by the ITU-T recommendation I-3635. Referring back to FIG. 4, the SAR forwards the SAR PDUs to the input port FPGA 420.

The function of the input port FPGA 420 is to transform the SAR PDUs into frames that are compatible with the Ethernet switch, for example, frames that are formatted according to IEEE 802.3. In prior art Ethernet switches, the FPGA extracts information from AAL-5 PDUs and builds standard Ethernet frames from the overhead information. In an embodiment, the input port FPGA encapsulates the AAL-5 PDUs according to the IETF RFC 1483/2684 specification.

In accordance with an embodiment of the invention, the FPGA has the ability to generate standard Ethernet frames and the ability to generate "tunnel" frames that are tunneled through the Ethernet switch as indicated by dashed line 428. Tunneling frames through the Ethernet switch provides an efficient and scaleable way to connect an input port ATM VC to an output port ATM VC across an Ethernet switch. In order to tunnel frames from ATM VCs through the Ethernet switch, the FPGA identifies particular PDUs that are to be tunneled through the Ethernet switch, identifies the intended switch output port and output VC of each PDU from the PDU's input port and input VC information, and encapsulates the PDUs in special tunnel frames.

Figure 5:
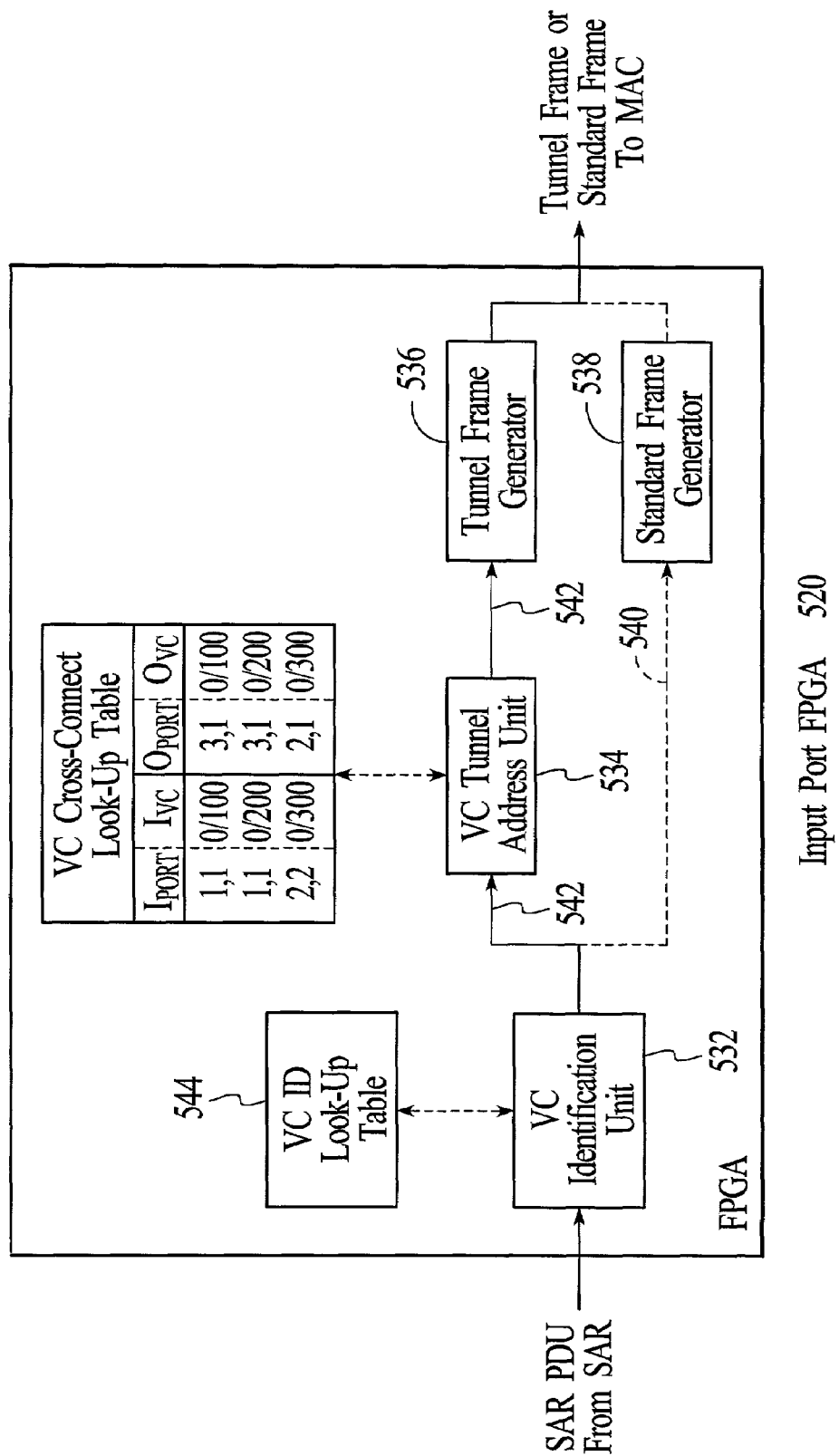
FIG. 5 is an expanded view of an embodiment of the input port FPGA shown in FIG. 4 that includes logic for generating tunnel frames.

FIG. 5 is an expanded view of an embodiment of the input port FPGA 420 shown in FIG. 4 that includes the input logic for tunneling certain PDUs to the appropriate output port of an Ethernet switch. In the embodiment of FIG. 5, the input port FPGA 520 includes a VC identification unit 532, a VC tunnel address unit 534, a tunnel frame generator 536, and a standard frame generator 538. The VC identification unit determines whether a PDU is to be forwarded as a standard Ethernet frame through the Ethernet switch or tunneled in accordance with an embodiment of the invention. In an embodiment, the VC identification unit accesses a list of all the VCs that are to be tunneled through the Ethernet switch. If a PDU is from a VC that is not supposed to be tunneled, then the PDU is forwarded to the standard frame generator, as indicated by the dashed line 540, and processed as a standard Ethernet frame for forwarding through the Ethernet switch. If, however, a PDU is from a VC that is supposed to be tunneled, then the PDU is forwarded to the VC tunnel address unit and then to the tunnel frame generator, as indicated by the solid line 542. In an embodiment, the VC identification unit utilizes the input port and input VC information that is identified within the re-assembly header of each SAR PDU to determine if the VC is one of the VCs that is to be tunneled. FIG. 5 depicts a VC identification look-up table 544 that is accessed by the VC identification unit to identify VCs that are supposed to be tunneled. In an embodiment, the VC identification look-up table includes a list of the VCs for which incoming PDUs should be tunneled, although in an alternative embodiment the table may include a list of all active VCs with the tunneled VCs having a special identifier.

Once a PDU (i.e., an IP datagram or an Ethernet frame) has been identified from its related input port and input VC information as a PDU that is to be tunneled, the PDU, the input port information, and the input VC information for the PDU are forwarded to the VC tunnel address unit 534. The VC tunnel address unit determines the intended output port (within the Ethernet switch) and output VC information of the PDU. In an embodiment, the VC tunnel address unit determines the intended output port and output VC information of the PDU from the input port and input VC information that is carried in the re-assembly header of the SAR PDU. FIG. 5 depicts a VC cross-connect look-up table that maps the input port, $I_{PORT}$, and the input VC, $I_{VC}$, of a PDU to a particular output port, $O_{PORT}$, and output VC, $O_{VC}$. The output information is obtained by doing a simple input port and input VC to output port and output VC look-up. Once the output information has been identified (i.e., $O_{PORT}$ and $O_{VC}$) for a PDU, the PDU and the output information are forwarded to the tunnel frame generator.

In an embodiment where the input and output VCs are to remain the same across the Ethernet switch (referred to as "VC stitching"), an input port and input VC pair is mapped to a specific output port and output VC pair, where the input and output VCs are the same. In an embodiment where the input VC is switched to a different output VC (referred to as "VC switching"), the input port and input VC pair is mapped to the related output port and output VC pair, where the input and output VCs are different. The output information (output port and output VC) from the VC tunnel address unit 534 is used by the tunnel frame generator 536 to generate a tunnel frame that includes the PDU (i.e., an IP datagram or an Ethernet frame) as the payload. In an embodiment, the generated tunnel frame includes the payload and a tunnel frame header that identifies the output port of the PDU, the output VC of the PDU, and that the frame is a tunnel frame. In an embodiment, the tunnel frame header includes a destination address that identifies the output port and the output VC of the PDU, a source address that identifies the input port and the input VC of the PDU, and a type field that identifies the frame as a tunnel frame.

FIG. 6 depicts the transformation of a group of ATM cells 650 (from the same VC) to a SAR PDU 654 and then to a tunnel frame 656 in accordance with an embodiment of the invention. The incoming ATM cells are fifty-three byte cells, each with five bytes of header 658 and forty-eight bytes of payload 660. As is well known in the field of ATM communications, the five byte headers include VCI and VPI information that define the VC of each cell. In an embodiment, it is assumed that the group of ATM cells originated from the same PDU, for example, an IP datagram or an Ethernet frame and that the group of ATM cells is carried on the same VC. The SAR PDU is formed by the SAR from the group of ATM cells that is received on the input port. In an embodiment, the SAR PDU includes the payload 662 and the re-assembly header 664. The re-assembly header includes the VC information (i.e., VPI/VCI) and the input port information for the PDU that is carried in the payload. Line 671 indicates that the VC information from the ATM cells is inserted into the re-assembly header. The tunnel frame that is formed by the FPGA includes frame overhead (e.g., a tunnel frame header 670 and a frame check sequence (FCS) 672) and the SAR payload 662 (i.e., including an IP datagram or an Ethernet frame) as its payload 668.

In an embodiment, the tunnel frame header 670 has the same structure as an Ethernet frame header and includes a six byte destination address, a six byte source address, and a 2 byte type field as specified by IEEE 802.3 and/or DIX Ethernet. In the embodiment of FIG. 6, the six byte destination address includes a three byte Organizationally Unique Identifier (OUI), one byte of output port information, and two bytes of output port VC information. As indicated by dashed line 673 and explained above with reference to FIG. 5, the input port and input VC information in the re-assembly header of the SAR PDU 654 is used by the input port FPGA to determine the one byte of output port information and the two bytes of output VC information of the tunnel frame header. In an embodiment, the OUI has its locally administered bit (LAB) set (bit number two), to identify the OUI as a locally administered OUI. In the embodiment of FIG. 6, the output port information includes a four bit slot identifier and a four bit port identifier and the VC information includes sixteen bits of VCI and VPI information as shown in the expanded view of the destination address.

Because the VC information is carried across the Ethernet switch in a sixteen bit field, $2^{16}$ (or 65,536) unique VCs can be identified per port. This technique exceeds the number of unique VCs possible using the above-described VLAN technique by sixteen times for a single port. That is, each port on the Ethernet switch can handle $2^{16}$ unique VCs using VC tunneling, whereas the VLAN technique is limited to $2^{12}$ unique VLANs throughout a switch regardless of the number of ports on the switch.

In the embodiment of FIG. 6, the six byte source address includes a three byte OUI, one byte of input port information, and two bytes of input port VC information. In the embodiment, the input port information includes a four bit slot identifier and a four bit port identifier, and the VC information includes sixteen bits of VCI and VPI information as shown in the expanded view of the source address.

In an embodiment, the two byte type field includes a unique tunnel frame identifier code that identifies the frame as a tunnel frame. As is described below, identifying a frame as a tunnel frame ensures that the tunnel frame bypasses a MAC-to-VC look-up at the output port FPGA and passes through the Ethernet switch in an expedited manner.

Referring back to FIG. 5, although the VC tunnel address unit 534 and the tunnel frame generator 536 are logically connected in series for description purposes, the units may be connected differently (i.e., in parallel) in the physical implementation of the FPGA. In an embodiment, the PDU is not physically sent to the VC tunnel address unit, but is buffered until the tunnel frame header information is obtained.

Referring back to FIG. 4, the Ethernet frames that are generated by the input port FPGA (either standard Ethernet frames or tunnel frames) are forwarded to the input port MAC 422. The input port MAC manages the Ethernet addressing control for the Ethernet switch. The input port MAC reads the MAC header of the incoming Ethernet frames and performs a look-up (layer 2 look-up) to determine how to forward the incoming Ethernet frames to their next destination within the switch. In the case of tunnel frames, special layer 2 flows are established within the MAC that enable tunnel frames to be switched from an input port to an output port without requiring any layer 2 learning. That is, the MAC forwarding table includes static entries that map the source address of the tunnel frame to the proper output port MAC address. In the case of standard frames, the input port MAC may have to learn where to forward the frame. The input port MAC forwards the frames to the input port IPP 424.

The input port IPP 424 performs next hop (layer 3) address look-ups, as necessary, for routed PDUs. Next hop look-ups are not required for bridged frames or tunnel frames. The IPP also controls the input of frames into the switch fabric 414. The switch fabric creates a datapath between an IPP and an OPP 426. Switch fabrics that are utilized in Ethernet switches are well known and may include shared memory, shared bus, and crosspoint matrices.

At the output port switch card 412, the OPP 426 controls the output of frames from the switch fabric and forwards frames to the output port MACs (as indicated by line 430) on the output port switch card. On the output port side, the MAC passes the standard frames and the tunnel frames on to the output port FPGA.

Figure 7:
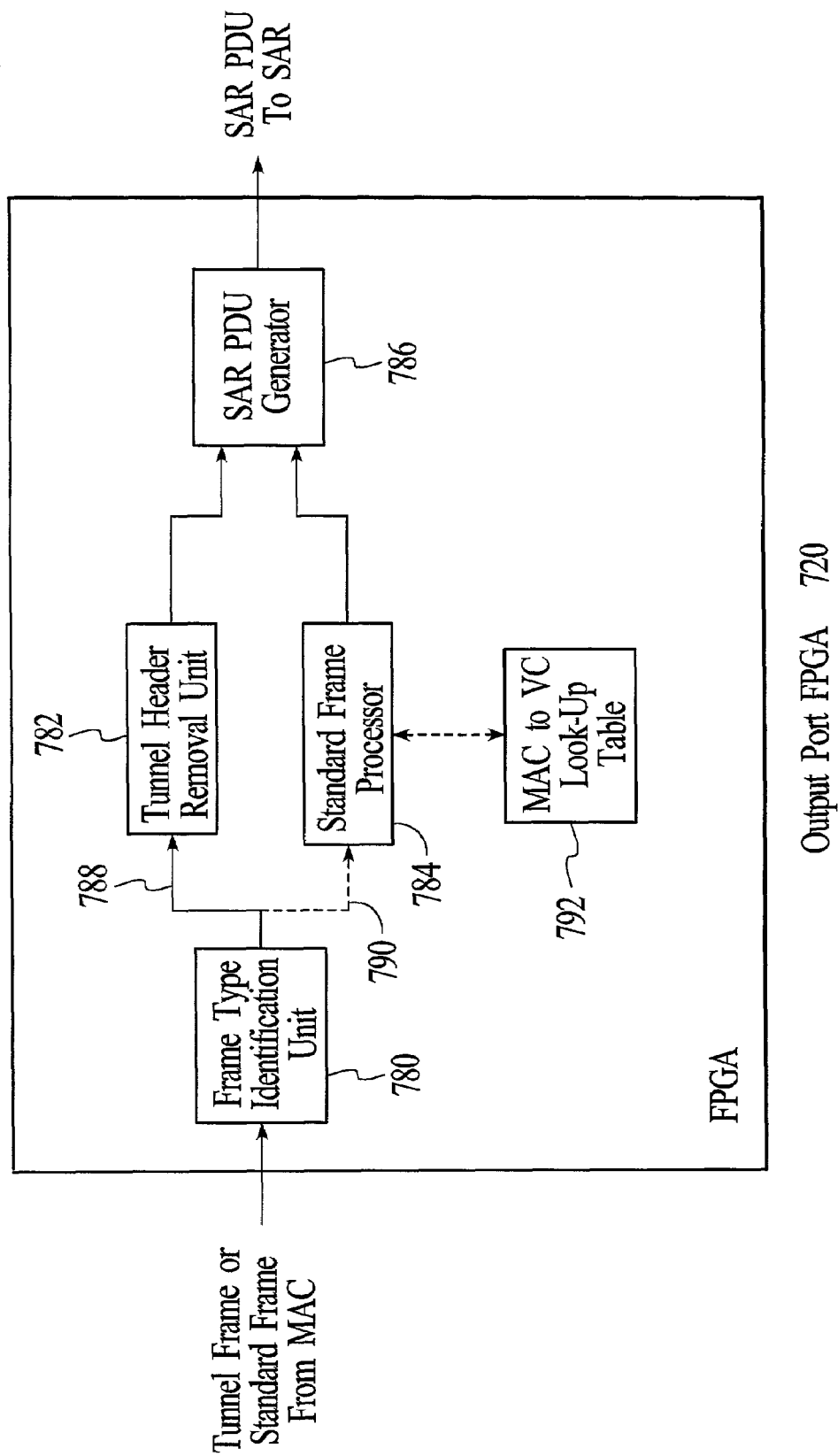
FIG. 7 is an expanded view of an embodiment of the output port FPGA shown in FIG. 4 that includes the logic for processing tunnel frames.

FIG. 7 is an expanded view of an embodiment of the output port FPGA 420 shown in FIG. 4 that includes the output logic for receiving tunnel frames or standard Ethernet frames. In the embodiment of FIG. 7, the output port FPGA 720 includes a frame type identification unit 780, a tunnel header removal unit 782, a standard frame processor 784, and a SAR PDU generator 786. The frame type identification unit determines which frames are tunnel frames and which frames are standard (or "non-tunneled") frames. In an embodiment, the frame type identification unit reads the two byte type field of each received frame to determine if the frame is a tunnel frame or a standard frame. If a frame is identified as a tunnel frame, then the frame is forwarded to the tunnel header removal unit 782 as indicated by the solid line 788. The tunnel header removal unit removes the tunnel frame header from the tunnel frame payload and extracts the output port and output VC information from the tunnel header. The extracted output port and output VC information is subsequently used by the SAR PDU generator to generate a SAR header. Because the output port and output VC information is carried in the tunnel frame header, the output port and output VC information can be provided to the SAR PDU generator without the MAC-to-VC look-up that is required for standard Ethernet frames (non-tunneled frames).

If a frame is not a tunnel frame, then the frame is forwarded to the standard frame processor as indicated by the dashed line 790 and processed as a standard Ethernet frame. Standard Ethernet frame processing requires a MAC-to-VC look-up to find the intended output port VC. A MAC-to-VC look-up table 792 is utilized to obtain the proper VC information for non-tunneled frames. Maintaining the MAC-to-VC look-up table and performing the MAC-to-VC look-up are time consuming processes that decrease the performance and increase the complexity of the FPGA. Once the MAC-to-VC look-up is completed, the AAL-5 PDU and the identified VC information are forwarded to the SAR PDU generator.

The SAR PDU generator within the FPGA generates SAR PDUs that include a SAR header (also referred to as a segmentation header) and a payload. In an embodiment, the SAR PDU generator performs multiprotocol encapsulation over AAL-5 as described in the IETF REC 1483/2684. The segmentation header includes the output port and output VC information for the PDU that is carried in the SAR payload. In an embodiment, the output port and output VC information is represented by a descriptor that is used by the SAR to look-up the output VC. The output port FPGA outputs SAR PDUs to the output port SAR.

The output port SAR generates fifty-three byte ATM cells from the SAR PDUs that are received from the output port FPGA. The SAR uses the VC information in the header of the SAR PDU to generate the ATM cell headers. The output port SAR forwards the fifty-three byte cells to the output port PHY for transmission over the second ATM connection to the next ATM node.

Figure 8:
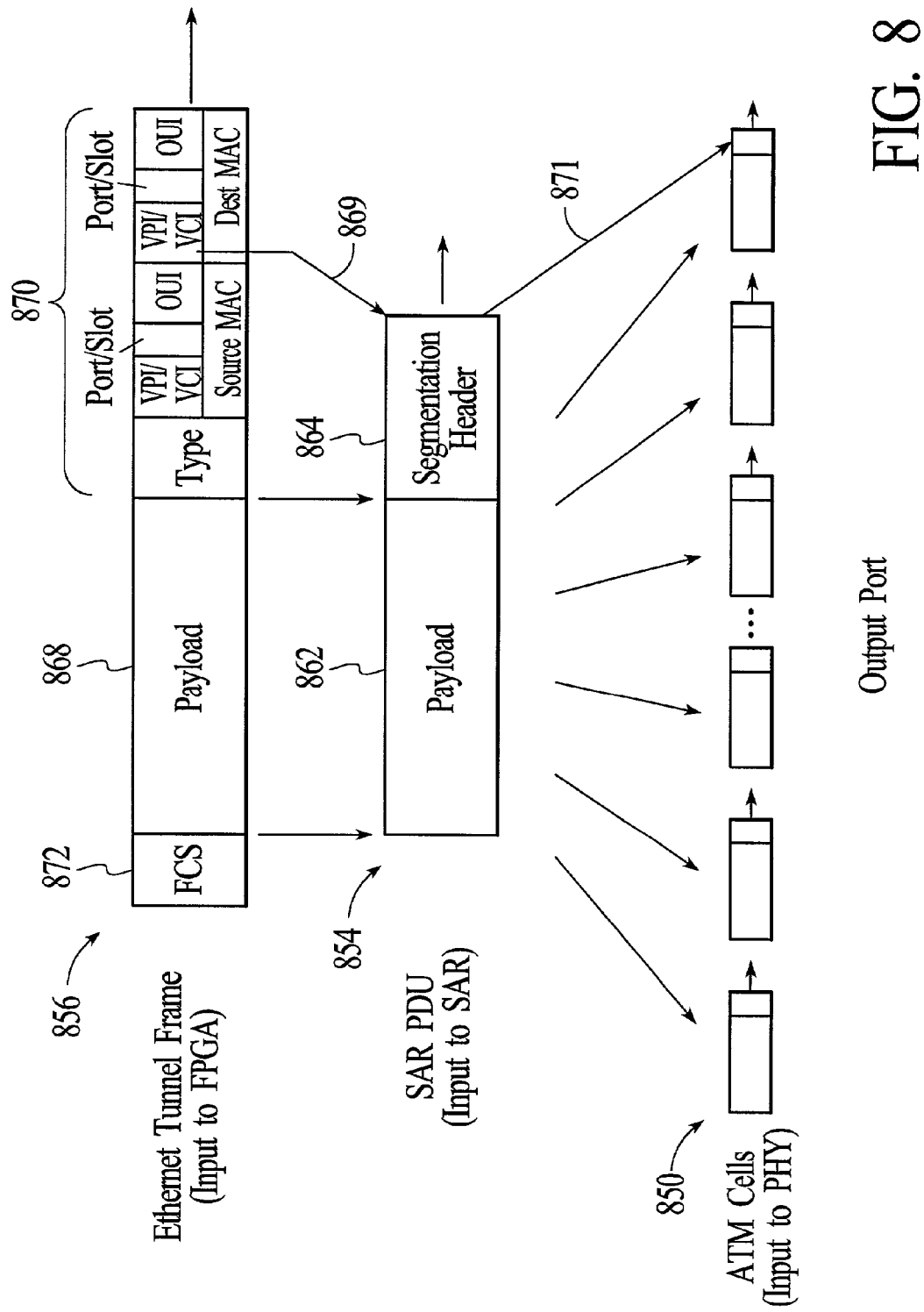
FIG. 8 depicts the transformation of a tunnel frame to a SAR PDU and then to a group of ATM cells from the same VC in accordance with an embodiment of the invention.

FIG. 8 depicts the transformation of a tunnel frame 856 to a SAR PDU 854 and then to a group of ATM cells (from the same VC) 850. The output port transformation depicted in FIG. 8 is nearly the reverse of the input port transformation depicted in FIG. 6. As shown in FIG. 8, the tunnel frame includes frame overhead (i.e., the tunnel frame header 870 and the FCS 872) and the SAR PDU payload 862 as its payload 868. The output port FPGA removes the tunnel frame header and the FCS and builds a segmentation header 864 that includes output VC information (as indicated by line 869). The SAR PDU that is output from the FPGA includes the SAR PDU payload and the segmentation header. The SAR utilizes the SAR PDU (including the SAR PDU payload and the segmentation header) to re-generate the ATM cells. The VC information from the segmentation header is used to create the ATM cell headers (as indicated by line 871) and the SAR PDU payload is used to generate the ATM cell payloads.

In an embodiment, the output ATM cells are the same as the input ATM cells, although in other embodiments, the output ATM cells may differ slightly from the input ATM cells. The fifty-three byte ATM cells are forwarded to the output port PHY where they are transmitted over the second ATM connection.

As described above, in an embodiment, PDUs from a first VC that are received at an input port can be switched by the Ethernet switch to a second, and different, VC. In order to perform "VC switching," the VC cross-connect look-up table described with reference to FIG. 5 maps an input VC to a different output VC. FIG. 9 depicts an example VC cross-connect look-up table that includes a "VC switching" entry and a "VC stitching" entry. The VC switching entry (the top entry) maps an input port and input VC to an output port and an output VC, where the output VC is different from the input VC. VC switching may be utilized to switch incoming traffic based on VC information. In contrast to the VC switching entry, the VC stitching entry (the bottom entry) maps an input port and input VC to an output port and to an output VC, where the output VC is the same as the input VC.

Figure 10:
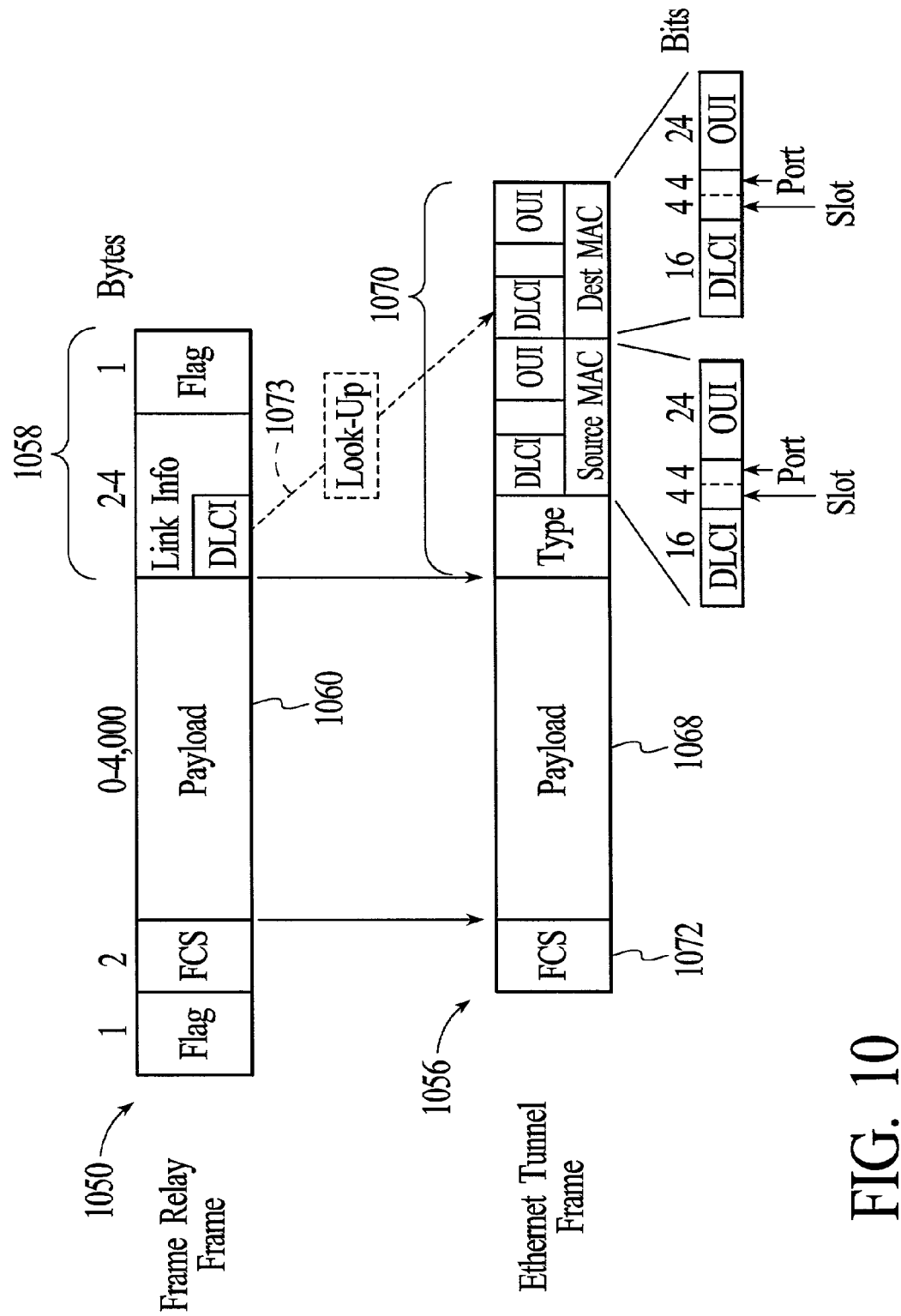
FIG. 10 depicts the transformation of a Frame Relay frame to a tunnel frame in accordance with an embodiment of the invention.

Although the method and system have been described with reference to an Ethernet switch that connects two ATM links, the method and system are also applicable to other network protocols that utilize VCs, such as the Frame Relay protocol. FIG. 10 depicts the transformation of a Frame Relay frame to a tunnel frame at the input side of an Ethernet switch that is similar to the transformation shown in FIG. 6. As shown in FIG. 10, the VC information, known as the data link connection identifier (DLCI), from the Frame Relay frame is used to look-up the output DLCI that is embedded in the destination address of the tunnel frame header as indicated by dashed line 1073. The payload of the Frame Relay frame is carried in the payload of the Ethernet tunnel frame. On the output side of the Ethernet switch and as shown in FIG. 11, the DLCI from the tunnel frame header is used (as indicated by line 1171) to build the Frame Relay header similar to the process described with reference to FIG. 8 for ATM cells.

Figure 11:
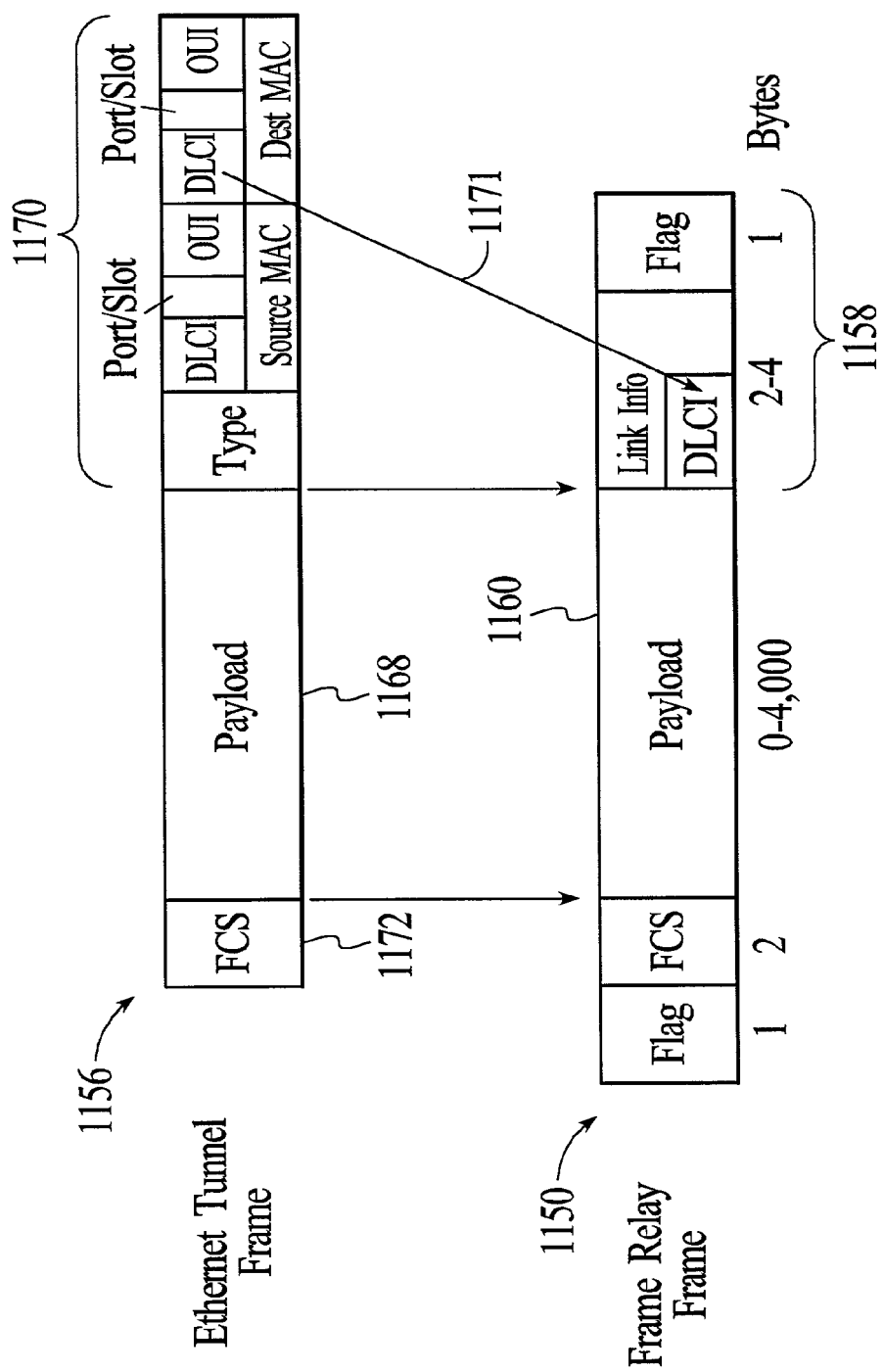
FIG. 11 depicts the transformation of a tunnel frame to a Frame Relay frame in accordance with an embodiment of the invention.

In the embodiment of FIGS. 10 and 11, the tunnel frame header 1070 and 1170 has the same structure as an Ethernet frame header and includes a six byte destination address, a six byte source address, and a two byte type field as specified by IEEE 802.3 and/or DIX Ethernet. The six byte destination address includes a three byte OUI, one byte of output port information, and two bytes of VC information. In the embodiment, the OUI has its locally administered bit (LAB) set (bit number two), to identify the OUI as a locally administered OUI. In the embodiment, the output port information includes a four bit slot identifier and a four bit port identifier and the VC information includes sixteen bits of DLCI information as depicted in FIG. 10 in the expanded view of the destination address. Because VC information is carried across the Ethernet switch in a sixteen bit field, $2^{16}$ (or 65,536) unique VCs can be identified per port. This technique exceeds the number of unique VCs possible using the above-described VLAN technique by sixteen times per port.

In the embodiment, the six byte source address includes a three byte OUI, one byte of input port information, and two bytes of input port VC information. In the embodiment, the input port information includes a four bit slot identifier and a four bit port identifier, and the VC information includes sixteen bits of DLCI information as shown in the expanded view of the source address.

Figure 12:
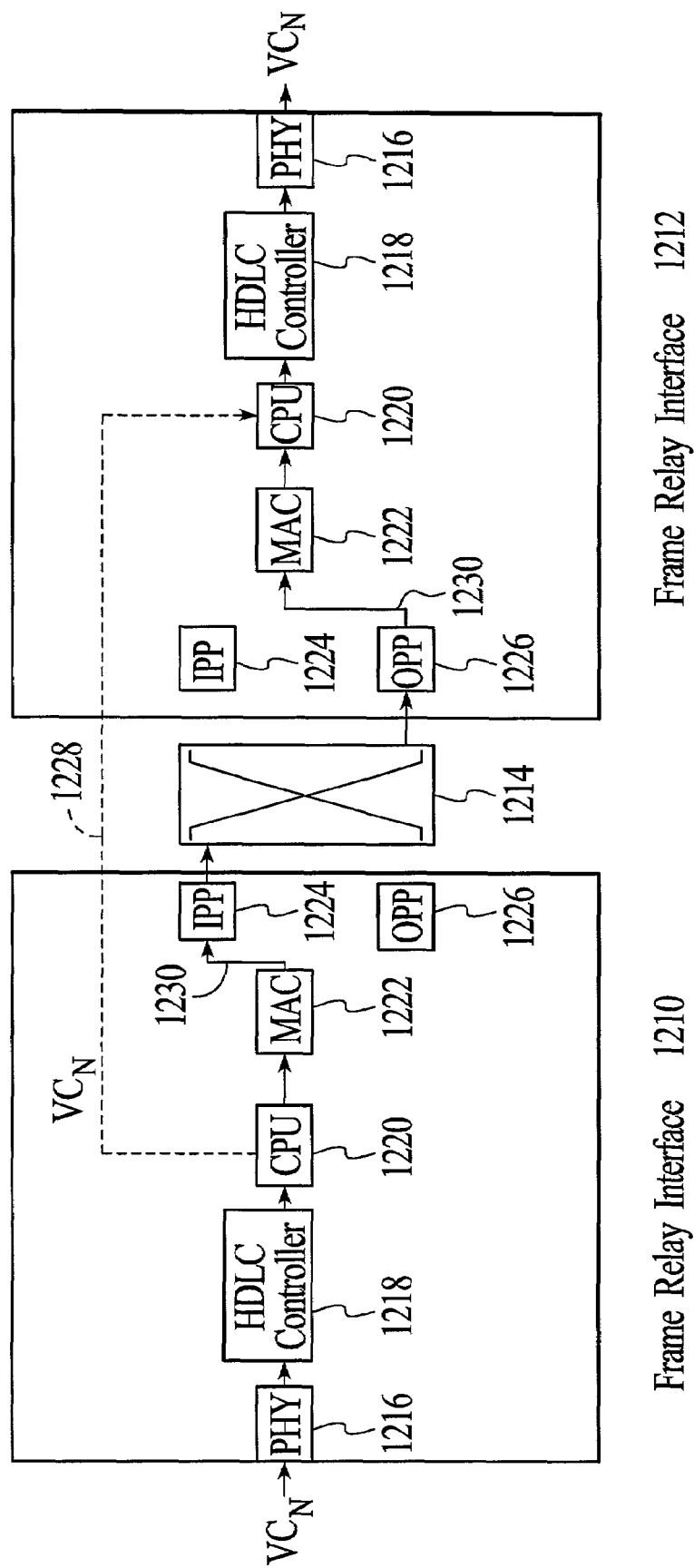
FIG. 12 is an expanded view of two Frame Relay switch cards that are connected by an Ethernet switch fabric and by a VC tunnel in accordance with an embodiment of the invention.

FIG. 12 depicts two Frame Relay interfaces (switch cards) that are connected by the switch fabric of an Ethernet switch. In the embodiment of FIG. 12, each switch card includes a PHY 1216, a High-Level Data Link Control (HDLC) controller 1218, a central processing unit (CPU) 1220, a MAC 1222, an IPP 1224, and an OPP 1226. The functionality for carrying out the VC tunneling that is supported by the FPGAs for the ATM embodiment, is supported by the CPU for the Frame Relay embodiment. Specifically, the VC identification unit, the VC tunnel address unit, the tunnel frame generator, the frame type identification unit, and the tunnel header removal unit and their respective functionality are supported by the CPU.

Figure 13:
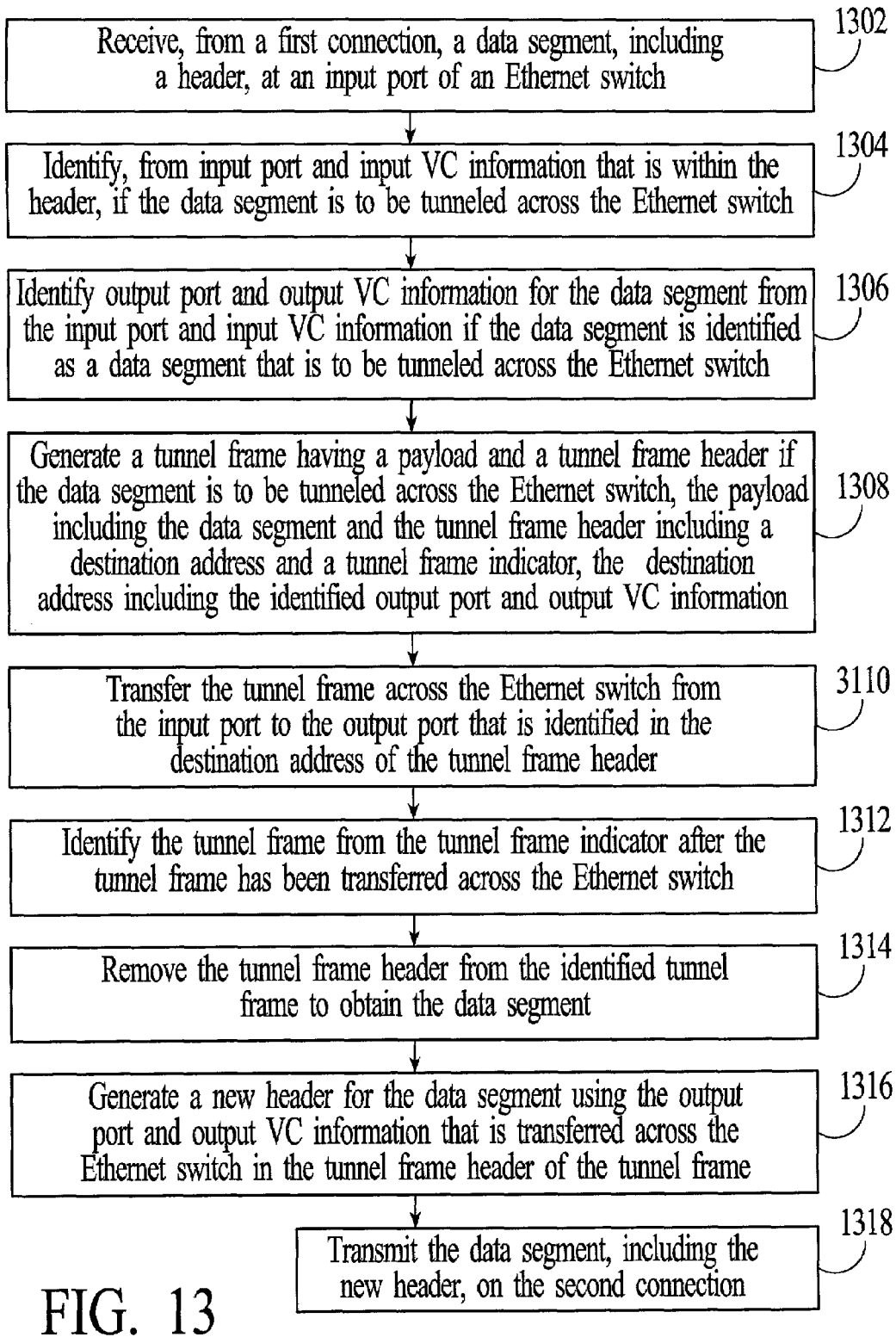
FIG. 13 is a process flow diagram of a method for transferring data segments and VC information related to the data segments across an Ethernet switch from a first connection terminating at an input port of the switch to a second connection originating at an output port of the switch.

The process flow diagram of FIG. 13 depicts a method for transferring data segments and VC information related to the data segments across an Ethernet switch from a first connection terminating at an input port of the switch to a second connection originating at an output port of the switch. The method involves steps of receiving (step 1302), from the first connection, a data segment, including a header, at the input port; identifying (step 1304), from input port and input VC information that is within the header, if the data segment is to be tunneled across the Ethernet switch; identifying (step 1306) output port and output VC information for the data segment from the input port and input VC information if the data segment is identified as a data segment that is to be tunneled across the Ethernet switch; generating (step 1308) a tunnel frame having a payload and a tunnel frame header if the data segment is to be tunneled across the Ethernet switch, the payload including the data segment and the tunnel frame header including a destination address and a tunnel frame indicator, the destination address including the identified output port and output VC information; transferring (step 1310) the tunnel frame across the Ethernet switch from the input port to the output port that is identified in the destination address of the tunnel frame header; identifying (step 1312) the tunnel frame from the tunnel frame indicator after the tunnel frame has been transferred across the Ethernet switch; removing (step 1314) the tunnel frame header from the identified tunnel frame to obtain the data segment; (step 1316) generating a new header for the data segment using the output port and output VC information that is transferred across the Ethernet switch in the tunnel frame header of the tunnel frame; and transmitting (step 1318) the data segment, including the new header, on the second connection.

What is claimed is:

1. A method for transferring data segments and virtual circuit (VC) information related to the data segments across an Ethernet switch from a first connection terminating at an input port of said Ethernet switch to a second connection originating at an output port of said Ethernet switch, wherein said first and second connections utilize a network protocol that is different from the network protocol that is utilized by said Ethernet switch to switch data, said data segments being transmitted on said first and second connections with headers that include VC information, said method comprising:

receiving, from said first connection, a data segment, including a header, at said input port;

identifying, from input port and input VC information that is within said header, if said data segment is to be tunneled across said Ethernet switch;

identifying output port and output VC information for said data segment from said input port and input VC information if said data segment is identified as a data segment that is to be tunneled across said Ethernet switch;

generating a tunnel frame having a payload and a tunnel frame header if said data segment is to be tunneled across said Ethernet switch, said payload including said data segment and said tunnel frame header including a destination address and a tunnel frame indicator, said destination address including said identified output port and output VC information;

transferring said tunnel frame across said Ethernet switch from said input port to said output port that is identified in said destination address of said tunnel frame header;

identifying said tunnel frame from said tunnel frame indicator after said tunnel frame has been transferred across said Ethernet switch;

removing said tunnel frame header from said identified tunnel frame to obtain said data segment;

generating a new header for said data segment using said output port and output VC information that is transferred across said Ethernet switch in said tunnel frame header of said tunnel frame; and transmitting said data segment, including said new header, on said second connection.

2. The method of claim 1 wherein said step of identifying said output port and output VC information of said data segment from said input port VC information includes a step of accessing a VC cross-connect look-up table that maps input port and input port VC information to output port and output port VC information.

3. The method of claim 2 wherein said VC cross-connect look-up table maps virtual channel identifier (VCI) and virtual path identifier (VPI) information to output ports of said Ethernet switch.

4. The method of claim 2 wherein said VC cross-connect look-up table maps data link connection identifier (DLCI) information to output ports and output port DLCI information of said Ethernet switch.

5. The method of claim 1 wherein said step of generating a tunnel frame includes a step of generating a tunnel frame that is formatted according to IEEE 802.3.

6. The method of claim 5 wherein said tunnel frame includes output VC information in the destination address field of the frame header.

7. The method of claim 5 wherein said data segment includes an ATM cell.

8. The method of claim 5 wherein said data segment includes a Frame Relay frame.

9. A system for transferring a group of ATM cells from the same input virtual circuit (VC) across an Ethernet switch from a first ATM connection terminating at an input port of said Ethernet switch to a second ATM connection originating at an output port of said Ethernet switch, wherein said input VC is identified by input VC information in the headers of said ATM cells, said system comprising:

a segmentation and re-assembly (SAR) unit, associated with said input port, for receiving said group of ATM cells and for generating a protocol data unit (PDU) from said group of ATM cells, wherein said PDU is formed from said ATM cells from said input VC such that said PDU is related specifically to said input VC;

a VC identification unit, associated with said input port, for identifying from said input VC information if said PDU is to be tunneled across said Ethernet switch;

a VC tunnel address unit, associated with said input port, for identifying output port and output VC information for said PDU from said input VC information if said PDU is identified by said VC identification unit as a PDU that is to be tunneled across said Ethernet switch;

a tunnel frame generator, associated with said input port, for generating a tunnel frame having a payload and a tunnel frame header, said payload including said PDU and said tunnel frame header including a destination address and a tunnel frame indicator, said destination address including said output port and output VC information that is identified by said VC tunnel address unit for said PDU;

a switch fabric for transferring said tunnel frame from said input port to said output port that is identified in said destination address of said tunnel frame header;

a frame type identification unit, associated with said output port, for identifying said tunnel frame from said tunnel frame indicator;

a tunnel header removal unit, associated with said output port, for removing said tunnel frame header from said identified tunnel frame to obtain said PDU;

a SAR unit, associated with said output port, for generating said group of ATM cells from said PDU and from said output port and output VC information that is transferred with said tunnel frame in said destination address of said tunnel frame header.

10. The system of claim 9 wherein said VC identification unit includes a VC identification look-up table that identifies VCs for which PDUs are to be tunneled across said Ethernet switch.

11. The system of claim 9 wherein said VC tunnel address unit includes a VC cross-connect look-up table that maps input port and input VC pairs to output port and output VC pairs.

12. The system of claim 11 wherein a first input VC maps to a first output VC and wherein said first input VC and said first output VC are the same VC.

13. The system of claim 11 wherein a first input VC maps to a first output VC and wherein said first input VC and said first output VC are different VCs.

14. The system of claim 9 wherein said tunnel frame generator generates frames that are formatted according to IEEE 802.3.

15. The system of claim 14 wherein said destination address of said tunnel frame header is six bytes.

16. The system of claim 15 wherein said destination address includes three bytes of output port information and output VC information.

17. The system of claim 15 wherein said destination address includes a three byte organizationally unique identifier (OUI) wherein the locally administered bit of said OUI is set.

18. The system of claim 14 wherein said tunnel frame header includes a source address that includes input port information and input VC information.

19. The system of claim 18 wherein said source address includes three bytes of input location port and input VC information.

20. The system of claim 9 wherein said tunnel frame indicator is included within a the 2 byte type field of an IEEE 802.3 frame.

21. A method for transferring a group of ATM cells from the same input virtual circuit (VC) across an Ethernet switch from a first ATM connection terminating at an input port of said Ethernet switch to a second ATM connection originating at an output port of said Ethernet switch, wherein said input VC is identified by input VC information in the headers of said ATM cells, said method comprising:

receiving said group of ATM cells at said input port;

generating a protocol data unit (PDU) from said group of ATM cells, wherein said PDU is related specifically to said input VC;

identifying, from input port and input VC information, if said PDU is to be tunneled across said packet switch;

identifying output port and output VC information for said PDU from said input port and input VC information if said PDU is identified as a PDU that is to be tunneled across said Ethernet switch;

generating a tunnel frame having a payload and a tunnel frame header if said PDU is to be tunneled across said Ethernet switch, said payload including said PDU and said tunnel frame header including a destination address and a tunnel frame indicator, said destination address including said identified output port and output VC information;

transferring said tunnel frame across said Ethernet switch from said input port to said output port that is identified in said destination address of said tunnel frame header;

identifying said tunnel frame from said tunnel frame indicator after said tunnel frame has been transferred across said Ethernet switch;

removing said tunnel frame header from said identified tunnel frame to obtain said PDU;

generating said group of ATM cells from said PDU and from said output port and output VC information that is transferred across said Ethernet switch in said tunnel frame header of said tunnel frame.

22. The method of claim 21 wherein said step of identifying, from said VC information, if said PDU is to be tunneled includes a step of accessing a VC identification look-up table that identifies VCs for which PDUs are to be tunneled.

23. The method of claim 21 wherein said step of identifying said output port and output VC information from said input port and input VC information includes a step of accessing a VC cross-connect look-up table.

24. The method of claim 23 wherein said VC cross-connect look-up table maps input port and input VC pairs to output port and output VC pairs.

25. The method of claim 24 wherein a first input VC maps to a first output VC and wherein said first input VC and said first output VC are the same VC.

26. The method of claim 24 wherein a first input VC maps to a first output VC and wherein said first input VC and said first output VC are different VCs.

27. The method of claim 21 wherein said step of generating a tunnel frame includes a step of generating a tunnel frame that is formatted according to IEEE 802.3 frames.

28. The method of claim 27 wherein said destination address includes three bytes of output port information and output VC information.

29. The method of claim 27 wherein said destination address includes a three byte organizationally unique identifier (OUI) wherein the locally administered bit of said OUI is set.

30. The method of claim 27 wherein said tunnel frame header includes a source address that includes input port information and input VC information.

31. The method of claim 30 wherein said source address includes three bytes of input port information and input VC information.

32. The method of claim 21 wherein said tunnel frame indicator is included within a 2 byte type field of an IEEE 802.3 frame.

33. A system for transferring a Frame Relay (FR) frame from the same input virtual circuit (VC) across an Ethernet switch from a first FR connection terminating at an input port of said Ethernet switch to a second FR connection originating at an output port of said Ethernet switch, each of said FR frames including a header and a payload, wherein said input VC is identified by input VC information in said header, said system comprising:

an input port central processing unit (CPU) including;
- VC identification unit means for identifying, from input VC information of a received FR frame, if said FR frame is to be tunneled across said Ethernet switch;
- VC tunnel address means for identifying output port and output VC information for said received FR frame from said input VC information if said FR frame is identified by said VC identification means as a frame that is to be tunneled across said Ethernet switch;
- tunnel frame generator means for generating a tunnel frame having a payload and a tunnel frame header, said payload including said payload of said received FR frame and said tunnel frame header including a destination address and a tunnel frame indicator, said destination address including said output port and output VC information that is identified by said VC tunnel address unit for said received FR frame;

a switch fabric for transferring said tunnel frame from said input port to said output port that is identified in said destination address of said tunnel frame header;

an output port CPU including;
- frame type identification means for identifying said tunnel frame from said tunnel frame indicator;
- tunnel header removal means for removing said tunnel frame header from said identified tunnel frame to obtain said payload of said received FR frame; and means, associated with said output port, for generating an output FR frame from said payload of said received FR frame and from said output port and output VC information that is transferred with said tunnel frame in said destination address of said tunnel frame header.

34. The system of claim 33 wherein said VC identification unit includes a VC identification look-up table that identifies VCs for which FR frames are to be tunneled across said Ethernet switch.

35. The system of claim 33 wherein said VC tunnel address unit includes a VC cross-connect look-up table that maps input port and input VC pairs to output port and output VC pairs.

36. The system of claim 35 wherein a first input VC maps to a first output VC and wherein said first input VC and said first output VC are the same VC.

37. The system of claim 35 wherein a first input VC maps to a first output VC and wherein said first input VC and said first output VC are different VCs.

38. The system of claim 33 wherein said tunnel frame generator generates frames that are formatted according to IEEE 802.3.

39. The system of claim 38 wherein said destination address of said tunnel frame header is six bytes.

40. The system of claim 39 wherein said destination address includes three bytes of output port information and output VC information.

41. The system of claim 33 wherein said tunnel frame indicator is included within a the 2 byte type field of an IEEE 802.3 frame.

\* \* \* \* \*